Patented Dec. 25, 1951

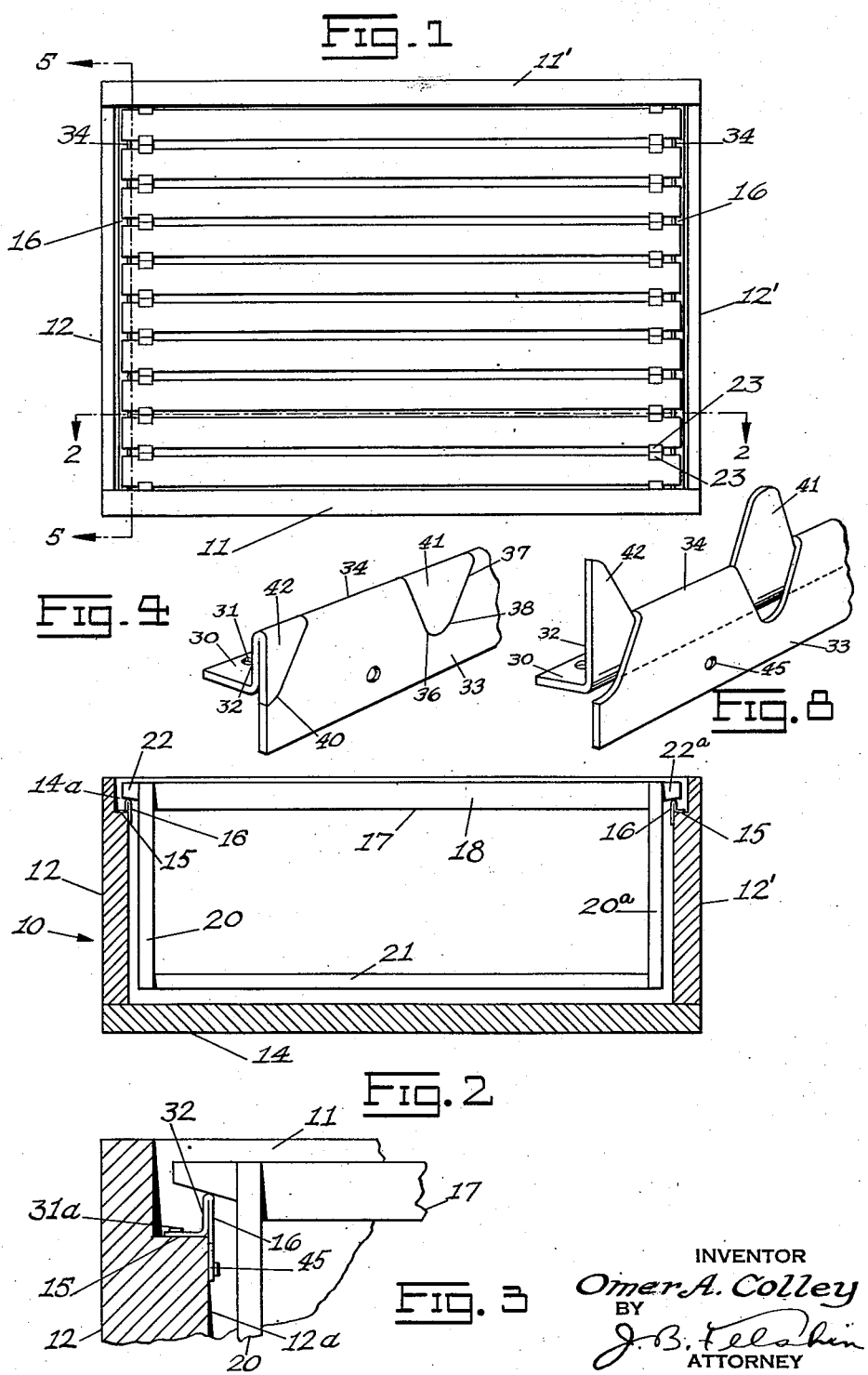

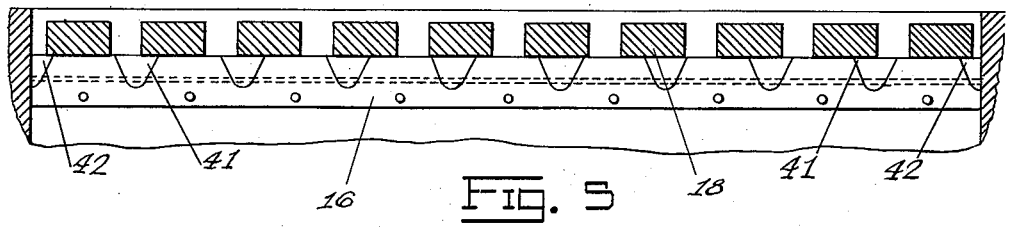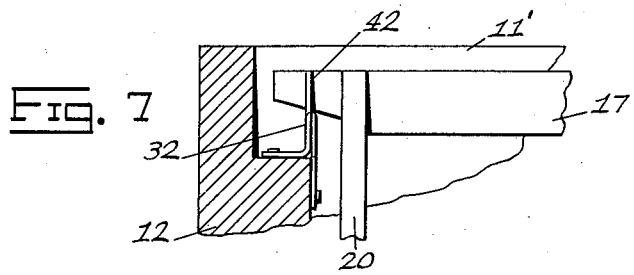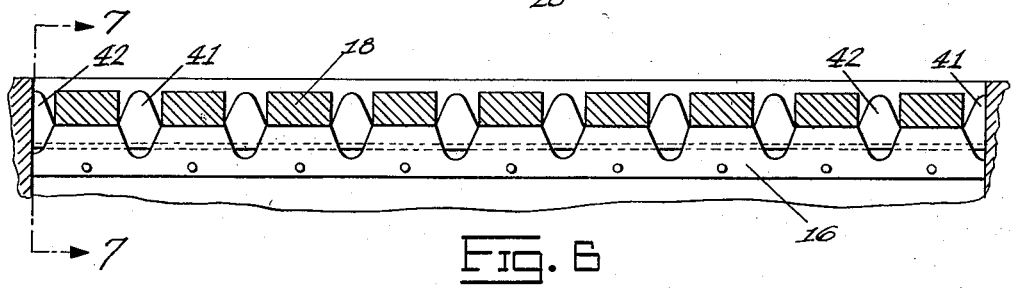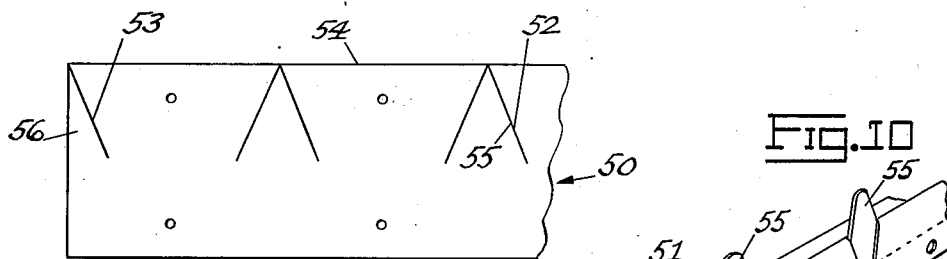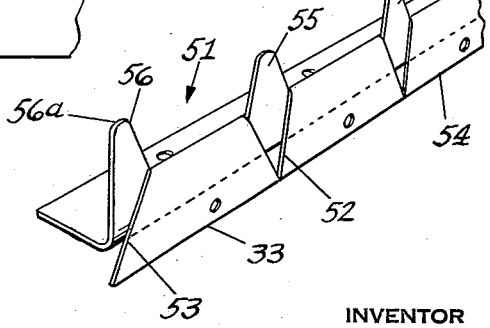

2,580,282

UNITED STATES PATENT OFFICE 2,580,282

SUPPORT AND SPACING DEVICE FOR HIVE BODY OR SUPER FRAMES

Omer A. Colley, New York, N. Y.

Application November 7, 1946, Serial No. 708,290

11 Claims. (Cl. 6—2)

This invention relates to a support and spacing device for hive body or super frames. It is particularly directed to a support and spacer members adapted to be mounted at opposite ends of a hive body or super for supporting frames therein.

It is well known that hive bodies and supers of the same size may receive different number of frames. Thus, whereas the brood chambers may receive ten frames snugly, the same box used as supers might receive only nine frames. Difficulty has been experienced in properly spacing the frames when less than the full number of frames which the super can receive are placed therein. It is important that equal and maximum spacing be provided between frames and heretofore much time has been consumed in achieving proper spacing. It is hence an object of this invention to provide frame supports and spacers on which either the full number of frames may be mounted or on which one less than the full number of frames may be mounted in perfectly spaced relation, such frame supports and spacers being provided with means to properly space the frames as they are placed into the super thereby saving considerable time.

With the use of the improved frame support and spacer embodying the invention, it is possible to obtain evenly drawn combs that are fat, that is extending over the edges of the frame so that uncapping for extracting of the honey is facilitated.

A further object of this invention is to provide an improved frame support and spacer which normally will permit insertion of the maximum number of frames from which a super is made and which may be adapted by a simple manipulation to space the frame so that one less than the maximum may be held rigidly in place in the super to permit the bees to draw all the combs out evenly and prevent the frames from being jumbled when handled and breaking and to prevent cappings from being broken and honey spilled before reaching the extracting plant, thereby saving much labor which has heretofore been necessary in hand spacing of the frame and obviating necessity for careful handling which has heretofore been necessary to prevent rupture of cappings prematurely.

Still a further object of this invention is to provide a strong, rugged and durable support and spacer for frames embodying the invention, which shall be relatively inexpensive to manufacture, which shall be easy to apply to supers or hive bodies, which may be easily changed from maximum frame condition to frame spacing position, and which shall be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown various possible illustrative embodiments of this invention, Fig. 1 is a top view of a super or hive body provided with frame support and spacers embodying the invention, and showing a maximum number of frames within the hive body or super and mounted on said supports and spacers;

Fig. 2 is a cross-sectional view taken on line 2—2 of Fig 1;

Fig. 3 is an enlarged partial cross-sectional view similar to a portion of the structure shown in Fig. 2;

Fig. 4 is a partial perspective view of one of the supports and spacer devices embodying the invention;

Fig. 5 is an enlarged cross-sectional view taken on line 5—5 of Fig.1;

Fig. 6 is a view similar to Fig. 5, but showing the support and spacer in condition for supporting and spacing one less than the maximum number of frames in the hive body or super;

Fig. 7 is an enlarged cross-sectional view taken on line 7—7 of Fig. 6;

Fig. 8 is a partial perspective view of the support and spacer shown in Fig. 6;

Fig. 9 is a partial top plan view showing the blank for making a combination spacer and support embodying the invention and illustrating a modified construction; and Fig. 10 is a perspective view of the spacer and support made from the blank shown in Fig. 9, but showing the spacing tabs in raised position for spacing the frames.

Referring now in detail to the drawing, 10 designates a hive body which may be used as a brood chamber or super and which may be of usual construction. It comprises side walls 11, 11', end walls 12, 12' and a bottom wall 14. At the upper ends of the end walls 12, 12' and on the inside thereof are grooves 14a, forming horizontal shoulders 15. Attached to and mounted on the shoulders 15 of walls 12, 12' are similar symmetrically disposed supports and spacers 16, embodying the invention, for supporting the comb frames 17. The comb frames 17 are of usual construction and comprise a top member 18, downwardly extending vertical end members 20, 20', and a bottom member 21. The top member 18 is provided with extensions 22, 22' which rest on the support 16.

It is well known that a hive body used as a brood chamber takes the maximum number of frames and that such hive bodies are so proportioned as to receive a predetermined number of frames 17 which snugly fit therein. Thus a hive body 10 is shown to receive a maximum of ten frames 17. The end members 20, 20' of the frames extend beyond the side edges of the top members 18 forming projections 23. The projections 23 of adjacent frames contact one another as shown in Fig. 1 of the drawing, thereby creating the proper space between frames which is necessary for the bees to work in. When such a hive body is used as a super instead of a brood chamber, one less than the maximum number of frames is mounted therein so that in the present instance only nine frames would be mounted in the hive body 10 and heretofore when less than the maximum number of frames were placed in a hive body, it was necessary to hand space the frames, and this was a tedious and labor consuming job and could not very well be done with a reasonable degree of accuracy. Furthermore, during shipping the frames were likely to move about and jumble and cause rupture of the caps.

Furthermore, if there was uneven spacing, it was not possible to obtain the maximum depth of combs.

The support and spacers 16 embodying the invention, as will be seen hereinafter, are so constructed that they may be used either with the maximum number of frames or with one less than the maximum number of frames, and in the latter instance, provision is made for accurately spacing the frames and holding the frames in properly spaced relation so that there is equal spaces between adjacent frames. The device 16, embodying the invention may be made of sheet metal or any other suitable material. It comprises a flange 30 which sits upon the shoulder 15 and is provided with a plurality of spaced openings 31 to receive nails or other fastening means 31a for attaching said devices to said shoulder. Extending upwardly from the inner end of flange 30 is a wall 32, from which there extends a downwardly projecting vertical wall 33. Wall 33 projects below shoulder 15 and contacts the inner surface 12a of wall 12. Between walls 32 and 33 is a bent back edge 34. The edge 34 is horizontal. The device 16 is of a length equal to the space between the inner surfaces of walls 11, so that it extends the full length of shoulder 15. Wall 33 is formed with a plurality of equally spaced U-shaped slits 36 which have arm portions 37 extending up to the turned back edge 34 and an interconnecting portion 38 which extends below the undersurface of flange 30. At the ends of wall 33, are slits 40 which are symmetrical with respect to one another and each comprising half of the slit 36. The slits 36 form a plurality of U-shaped tab portions 41, and the slits 40 form tab portions 42 which are equal to half of the tab portions 41. The length of edges 34 between adjacent tabs 41 or between the tabs 42 and their adjacent tabs 41 are equal to the width of portions 22 of the frames for the purpose hereinafter appearing. When the hive body is designed to receive a maximum of ten frames, there are eight tabs 41 and two end tabs 42. Hence there are nine edge portions 34 between tab portions 41 or between tab portions 42 and 41.

As shown in Figs. 1, 2, 3, 4 and 5 when the device 16 is used for maximum number of frames, the tabs 41 and 42 are in the plane of wall 33, therefore forming a continuous unbroken upper edge 34 and the maximum number of frames may be mounted on a pair of supports 16 with the undersides of the extensions 22 resting on said upper edges 34. In such event, the frames are self-spacing as heretofore described. However, when the device 16 is to be used for one less than the maximum number of frames as shown in Figs. 6, 7, 8, the tabs 41 and 42 are swung upwardly to vertical upstanding position so that they are substantially in the plane of wall 32. When thus bent upwardly, there is presented nine equally spaced edges 34 of equal length so that nine frames may be mounted on said supports with the extensions 22 on the edges 34 and between the tabs 41 or 41 and 42. The front wall 33 may be formed with a plurality of spaced openings or holes 45 to receive nails or fastening members 46 driven therethrough and into wall 12 so that member 16 is firmly attached in place.

It will be understood that when the tabs are up, the frames may be quickly placed into position and the tabs serve to do the spacing and to hold the frames in spaced relation to one another.

In Fig. 9 there is shown a blank 50 of sheet metal or other suitable material from which a frame support and spacer 51 embodying the invention and illustrating a modified construction may be made. The device 51 is similar to the device 16, except that the slits 36 and 40 of device 16 are replaced by slits 52 and 53 which extend down to the lower edge 54 of wall 33a, thereby producing more elongated tabs 55 and 56 which may be bent upwardly to the position shown in Fig. 10 when used for spacing and supporting one less than a maximum number of frames in a bee hive. The points of the tabs may be snipped off, as at 56a, so as to keep the tab within the bee hive body. The addition of the construction shown in Figs. 9 and 10 is that the slits 52 and 53 extend to the edge 54 and hence may be cut by means of a shear or other instrument which cuts from edge 54. Obviously the tabs 55 and 56 may be stamped in a stamping press instead of being cut by means of shears.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. A device of the character described comprising an elongated member made of bendable sheet metal and having a horizontal flange, a wall extending upwardly from said flange and a wall extending downwardly from the upper end of the first wall and forming a straight ledge therewith and projecting below said flange, said second wall being formed with a plurality of spaced slits forming downwardly projecting tabs normally lying in the plane of said second wall but being bendable upwardly to project above said ledge, said tabs when in the plane of said second wall extending from substantially the upper end of said second wall down to a point below said flange.

2. A device of the character described comprising an elongated member made of bendable sheet metal and having a horizontal flange, a wall extending upwardly from said flange and a wall extending downwardly from the upper end of the first wall and forming a straight ledge therewith and projecting below said flange, said second wall being formed with a plurality of spaced slits forming downwardly projecting tabs normally lying in the plane of said second wall but being bendable upwardly to project above said ledge, said tabs when in the plane of said second wall extending from substantially the upper end of said second wall down to a point below said flange, said flange and second wall being each formed with a plurality of spaced openings to receive fasteners for fastening said member to a beehive body.

3. A device of the character described comprising an elongated member made of bendable sheet metal and having a horizontal flange, a wall extending upwardly from said flange and a wall extending downwardly from the upper end of the first wall and forming a straight ledge therewith and projecting below said flange, said second wall being formed with a plurality of spaced slits forming downwardly projecting tabs normally lying in the plane of said second wall but being bendable upwardly to project above the said ledge, said slits extending up to said ledge so that said tabs may be bent about said ledge.

4. A beehive frame support made of a single piece of bendable sheet metal and comprising a horizontal flange and wall co-extensive therewith and extending upwardly therefrom, and a second wall extending from the upper end of the first wall and co-extensive therewith, and forming a folded top edge therewith, said second wall extending to a point below said flange, said second wall being formed with a plurality of spaced U-shaped slits, the frames of said slits extending upwardly to said edge and each slit forming a tab normally projecting downwardly and disposed within the plane of said second wall, and said tabs being each bendable upwardly to project above said edge.

5. A beehive frame support made of a single piece of bendable sheet metal and comprising a horizontal flange and wall co-extensive therewith and extending upwardly therefrom, and a second wall extending from the upper end of the first wall and co-extensive therewith, and forming a folded top edge therewith, said second wall extending to a point below said flange, said second wall being formed with a plurality of spaced U-shaped slits, the frames of said slits extending upwardly to said edge and each slit forming a tab normally projecting downwardly and disposed within the plane of said second wall, said tabs being each bendable upwardly to project above said edge, the lower ends of said slits extending below said flange but terminating above the lower edge of said second wall.

6. A beehive frame support made of a single piece of bendable sheet metal and comprising a horizontal flange and wall co-extensive therewith and extending upwardly therefrom, and a second wall extending from the upper end of the first wall and co-extensive therewith, and forming a folded top edge therewith, said second wall extending to a point below said flange, said second wall being formed with a plurality of spaced U-shaped slits, the frames of said slits extending upwardly to said edge and each slit forming a tab normally projecting downwardly and disposed within the plane of said second wall, said tabs being each bendable upwardly to project above said edge, the lower ends of said slits extending below said flange but terminating above the lower edge of said second wall, said flange being formed with a plurality of spaced nail openings and said second wall being formed with a plurality of spaced nail openings disposed below said flange.

7. A beehive frame support comprising an elongated member made of bendable sheet metal and having a horizontal flange, a wall extending upwardly from said flange and a wall extending downwardly from the upper end of the first wall about folded-over edges and projecting below said flange, and a plurality of equally spaced tabs projecting upwardly above the first wall, and said second wall being formed with openings similar in shape and symmetrically disposed relative to the tabs, whereby said tabs serve to space beehive frames resting on the folded-over edges between the first and second walls and between said tabs, and said tabs being bendable downwardly about their bases into said openings, whereby the folded-over edges between said first wall and the downwardly bent tabs together with the folded-over edges between the first and second walls will provide a continuous straight ledge for supporting beehive frames more closely spaced together.

8. A beehive frame support comprising an elongated member made of bendable sheet metal and having a horizontal flange, a wall extending upwardly from said flange and a wall extending downwardly from the upper end of the first wall about folded-over edges and projecting below said flange, and a plurality of equally spaced tabs projecting upwardly above the first wall, and said second wall being formed with openings similar in shape and symmetrically disposed relative to the tabs, whereby said tabs serve to space beehive frames resting on the folded-over edges between the first and second walls and between said tabs, and said tabs being bendable downwardly about their bases into said openings, whereby the folded-over edges between said first wall and the downwardly bent tabs together with the folded-over edges between the first and second walls will provide a continuous straight ledge for supporting beehive frames more closely spaced together, said openings extending downwardly below said flange.

9. A beehive frame support comprising an elongated member made of bendable sheet metal and having a horizontal flange, a wall extending upwardly from said flange and a wall extending downwardly from the upper end of the first wall about folded-over edges and projecting below said flange, and a plurality of equally spaced tabs projecting upwardly above the first wall, and said second wall being formed with openings similar in shape and symmetrically disposed relative to the tabs, whereby said tabs serve to space beehive frames resting on the folded-over edges between the first and second walls and between said tabs, and said tabs being bendable downwardly about their bases into said openings, whereby the folded-over edges between said first wall and the downwardly bent tabs together with the folded-over edges between the first and second walls will provide a continuous straight ledge for supporting beehive frames more closely spaced together, said openings extending downwardly below said flange, and said flange being formed with a plurality of spaced nail holes.

10. A beehive frame support comprising an elongated member made of bendable sheet metal and having a horizontal flange, a wall extending upwardly from said flange and a wall extending downwardly from the upper end of the first wall about folded-over edges and projecting below said flange, and a plurality of equally spaced tabs projecting upwardly above the first wall, and said second wall being formed with openings similar in shape and symmetrically disposed relative to the tabs, whereby said tabs serve to space beehive frames resting on the folded-over edges between the first and second walls and between said tabs, and said tabs being bendable downwardly about their bases into said openings, whereby the folded-over edges between said first wall and the downwardly bent tabs together with the folded-over edges between the first and second walls will provide a continuous straight ledge for supporting beehive frames more closely spaced together, said openings extending downwardly below said flange, said flange being formed with a plurality of spaced nail holes, and said second wall being formed with a plurality of spaced nail holes between the openings and below said horizontal flange.

11. A support and spacer for beehive frames comprising a single member made of bendable sheet metal adapted to be attached to a wall of a beehive body and provided with a plurality of spaced portions disposed in a straight line to support spaced beehive frames each resting on one of said portions, and said member being further provided with means projecting above said portions for spacing the frames resting on said portions, and said spacing means being bendable downwardly below said portions to provide supporting portions which with said spaced supporting portions will form a continuous support for beehive frames resting thereon in more closely spaced relation.

OMER A. COLLEY.

REFERENCES CITED

The following references are of record in the file of this patent:

UNITED STATES PATENTS

| Number | Name | Date |
| --- | --- | --- |
| 1,262,779 | Gray | Apr. 16, 1918 |
| 1,370,775 | Bacon | Mar. 8, 1921 |
| 1,782,202 | Frater | Nov. 18, 1930 |
| 1,929,648 | Phillips | Oct. 10, 1933 |
| 2,090,042 | Hasselbach | Aug. 17, 1937 |
| 2,446,346 | Stoller | Aug. 3, 1948 |